United States Patent
Dumm

(10) Patent No.: US 9,329,458 B1
(45) Date of Patent: *May 3, 2016

(54) PAN/TILT HEAD WITH TILT RANGE EXTENDER

(71) Applicant: Mark T. Dumm, Cleveland Heights, OH (US)

(72) Inventor: Mark T. Dumm, Cleveland Heights, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/521,949

(22) Filed: Oct. 23, 2014

Related U.S. Application Data

(63) Continuation of application No. 13/853,715, filed on Mar. 29, 2013, now Pat. No. 8,870,474, which is a continuation-in-part of application No. 13/494,369, filed on Jun. 12, 2012, now abandoned, which is a continuation of application No. 12/901,659, filed on Oct. 11, 2010, now Pat. No. 8,200,078, which is a continuation of application No. 12/265,194, filed on Nov. 5, 2008, now Pat. No. 7,811,008, which is a continuation of application No. 11/122,682, filed on May 5, 2005, now Pat. No. 7,527,439.

(60) Provisional application No. 61/695,724, filed on Aug. 31, 2012, provisional application No. 60/568,596, filed on May 6, 2004.

(51) Int. Cl.
  *G03B 17/56* (2006.01)
  *F16M 11/10* (2006.01)
  *F16M 11/18* (2006.01)
  *F16M 11/12* (2006.01)

(52) U.S. Cl.
  CPC ............ *G03B 17/561* (2013.01); *F16M 11/18* (2013.01); *F16M 11/10* (2013.01); *F16M 11/12* (2013.01)

(58) Field of Classification Search
  CPC ..... G03B 17/561; F16M 11/04; F16M 11/10; F16M 11/12; F16M 11/18; H04N 5/23216
  USPC ......... 396/419, 427–428; 248/183.4; 352/243
  See application file for complete search history.

(56) References Cited

U.S. PATENT DOCUMENTS

| | | |
|---|---|---|
| 1,493,367 A | 5/1924 | Mery |
| 1,943,360 A | 1/1934 | Arnold |
| 2,796,226 A | 6/1957 | Dalton et al. |
| 3,273,484 A | 9/1966 | Lapsley |
| 3,995,797 A | 12/1976 | Knight |
| 4,040,587 A | 8/1977 | Gottschalk et al. |
| 4,157,476 A | 6/1979 | O'Connor |
| 4,337,482 A | 6/1982 | Coutta |
| 4,447,033 A | 5/1984 | Jaumann et al. |
| 4,466,590 A | 8/1984 | Parks et al. |
| 4,557,459 A | 12/1985 | Lindsay |
| 4,657,220 A | 4/1987 | Lindsay |
| 4,732,357 A | 3/1988 | Lindsay |
| 5,056,745 A | 10/1991 | Gelbard |

(Continued)

*Primary Examiner* — Christopher Mahoney
(74) *Attorney, Agent, or Firm* — Richard M. Klein; Fay Sharpe LLP

(57) ABSTRACT

A pan/tilt head that can be used with a camera is disclosed that includes a tilt range extender. The pan/tilt head has a main housing formed from a central housing and two housing sides. A pantograph linkage is connected to a housing side. The pantograph linkage includes an upper transverse member and a lower transverse member. The lower transverse member is connected to the housing side at a non-rotating mount on the tilt axis. The upper transverse member is connected to the tilt range extender. The tilt range extender rotates about the tilt axis.

11 Claims, 11 Drawing Sheets

(56) References Cited

U.S. PATENT DOCUMENTS

| | | |
|---|---|---|
| 5,111,288 A | 5/1992 | Blackshear |
| 5,150,627 A | 9/1992 | Lindsay |
| 5,170,197 A | 12/1992 | Schmidt et al. |
| 5,218,876 A | 6/1993 | Lindsay |
| 5,288,043 A | 2/1994 | Tigliev |
| 5,389,972 A | 2/1995 | Cartoni |
| 5,469,793 A | 11/1995 | Lindsay |
| 5,627,616 A | 5/1997 | Sergeant et al. |
| 5,850,579 A | 12/1998 | Melby et al. |
| 5,956,081 A | 9/1999 | Katz et al. |
| 6,027,257 A | 2/2000 | Richards et al. |
| 6,400,401 B1 | 6/2002 | Morino et al. |
| 6,567,121 B1 | 5/2003 | Kuno |
| 6,680,746 B2 | 1/2004 | Kawai et al. |
| 6,720,987 B2 | 4/2004 | Koyanagi et al. |
| 7,527,439 B1 | 5/2009 | Dumm |
| 7,811,008 B2 | 10/2010 | Dumm |
| 8,004,561 B2 | 8/2011 | Mottur et al. |
| 8,200,078 B2 | 6/2012 | Dumm |
| 8,870,474 B1 * | 10/2014 | Dumm .......................... 396/419 |
| 2002/0075307 A1 | 6/2002 | Alexander et al. |
| 2003/0093805 A1 | 5/2003 | Gin |
| 2005/0052351 A1 | 3/2005 | Doyen et al. |

\* cited by examiner

PAN/TILT HEAD WITH TILT RANGE EXTENDER

CROSS-REFERENCE TO RELATED APPLICATIONS

This application is a continuation of U.S. patent application Ser. No. 13/853,715, filed on Mar. 29, 2013, which claimed priority to U.S. Provisional Patent Application Ser. No. 61/695,724, filed on Aug. 31, 2012; and was also a continuation-in-part of U.S. patent application Ser. No. 13/494,369, filed on Jun. 12, 2012, which is a continuation of U.S. patent application Ser. No. 12/901,659, filed Oct. 11, 2010, now U.S. Pat. No. 8,200,078, which is a continuation of U.S. patent application Ser. No. 12/265,194, filed Nov. 5, 2008, now U.S. Pat. No. 7,811,008, which is a continuation of U.S. patent application Ser. No. 11/122,682, filed May 5, 2005, now U.S. Pat. No. 7,527,439, which claims priority to U.S. Provisional Application Ser. No. 60/568,596, filed May 6, 2004. The disclosures of all of these applications are incorporated herein by reference in their entirety.

BACKGROUND

The present disclosure relates to a control system, which can be particularly used for a payload such as a camera. The control system includes a pan/tilt head that includes a structure to increase the tilt range of the pan/tilt head.

In the design of any camera control system, an important factor to be considered is the camera's center of gravity (c.g.). A camera control system is designed to control the degree of pan and tilt of the camera. "Pan" refers to horizontal motion of the camera around the vertical axis, i.e. side-to-side motion. "Tilt" refers to vertical motion around a horizontal axis, or in other words rotation in a vertical plane, i.e. up-and-down motion. The further the camera's c.g. is from either motion axis, the more torque is needed to move the camera to the desired location. Historically, designers of remote control pan/tilt camera heads have dealt with the issue of camera c.g. in one of two ways.

In one approach, previous designers chose one or the other (vertical or horizontal) axis and rotated the camera around its c.g. in that axis only. If the designers chose to rotate the camera around the vertical axis, then the camera was mounted on the top of the device. The problem with this design is that as soon as the camera is tilted, the weight of the camera is shifted forward or backward. This weight must then be lifted in order to revert to the original position and, until that is done, the whole system of camera and mount is in an unbalanced state. This imbalance requires more motor force to move the camera. If the designers chose to rotate the camera around the horizontal axis, then the camera was mounted from the side of the device. Here, the camera may be tilted up and down without shifting its weight forward and backward, but additional torque is required to pan the camera since the c.g. of the camera is offset from the center of rotation around the vertical axis.

Other designs feature the camera moving both horizontally and vertically around the camera's c.g. This is done using a relatively large framework and an "L-shaped" or "U-shaped" bracket. The tilting motor and bearings are located to the side of the camera, and the panning motor and bearings are located directly below (or above) the camera. Though the camera usually remains balanced, it is at the expense of a larger and heavier support framework, which must be moved right along with the camera as it is panned. There is thus a need for improved pan/tilt equipment.

BRIEF SUMMARY

Disclosed in various embodiments are pan/tilt heads that place the payload's center of rotation along the same axis as the center of gravity of the payload. The center of gravity does not move relative to the base, and so there is less need to counterweight. In particular, the pan/tilt heads of the present disclosure are able to tilt at angles from −90 degrees to +90 degrees.

Disclosed in various embodiments is a pan/tilt head comprising: a main housing; and a first pantograph linkage comprising an upper transverse member and a lower transverse member. The lower transverse member is located at a center point of the main housing and the upper transverse member is connected to a circumferential point of the main housing, the circumferential point being rotatable around the center point.

The circumferential point can rotate through a range of about 90 degrees.

The circumferential point may be on a rotating member having an engagement surface. A stop surface on the main housing can cooperate with the engagement surface to control the extent of rotation of the upper transverse member.

Different variations are contemplated. In some, the stop surface may be in the form of a hole in the main housing that interacts with a retractable pin on the engagement surface of the rotating member. Put another way, here the engagement surface is an inner surface adjacent a first housing side of the main housing. Alternatively, the stop surface can be in the form of a sawtooth surface on a side of the main housing that interacts with an inner sawtooth surface of the rotating member. Alternatively, an outer perimeter of the rotating member includes teeth and spaces (i.e. lands) between the teeth. The stop surface is in the form of a spar which extends from the main housing into a space between two teeth.

The first pantograph linkage may further comprise two support bars. The upper transverse member and the lower transverse member each can comprise an elevator arm and a crossbar. In such embodiments, the elevator arm provides a mounting corner and the crossbar provides two support corners, the transverse member being connected to the main housing at the mounting corner and to each support bar at the two support corners. The elevator arm and the crossbar can be adjusted to change the distance and/or angle between the mounting corner and the two support corners The pan/tilt head may further comprise a mounting platform connected to the two support bars. The pan/tilt head may further comprise a second pantograph linkage connected to a side of the main housing opposite that of the first pantograph linkage. The pan/tilt head may further comprise a first tilt motor operatively coupled to the first pantograph linkage. The pan/tilt head may further comprise a second tilt motor operatively coupled to the circumferential point to control the degree of rotation. The pan/tilt head may further comprise a tilt motor arranged within the main housing. The pan/tilt head may further comprise a pan motor arranged to rotate the main housing about a pan axis.

Also disclosed in various embodiments is a pan/tilt head comprising a main housing and a first pantograph linkage connected to the main housing. The main housing comprises a central housing, a first housing side, and a second housing side opposite the first housing side. The first pantograph linkage includes a central transverse member and an outer transverse member. The central transverse member is present on the first housing side on a non-rotating mount along a tilt axis. The outer transverse member is connected to a rotating mount on the first housing side that can rotate about the tilt axis.

The rotating mount can rotate through a range of about 90 degrees.

The rotating mount may be on a rotating member having an engagement surface and an arc. A stop surface on the first housing side may cooperate with the engagement surface to control the extent of rotation of the upper transverse member.

Also disclosed in various embodiments is a pan/tilt head comprising: a main housing; a tilt range extender; and a first pantograph linkage comprising an upper transverse member and a lower transverse member; the lower transverse member being connected along a tilt axis of the main housing and the upper transverse member being connected to the tilt range extender, the tilt range extender being rotatable around the tilt axis.

The tilt range extender may interact with a stop surface on the main housing to control the degree of rotation. In some embodiments, the stop surface is a hole on the main housing that interacts with a retractable pin in the tilt range extender. In other embodiments, the stop surface is a wall extending from the main housing. The tilt range extender may be in the form of a rotating member.

These and other non-limiting aspects and/or objects of the disclosure are more particularly described below.

BRIEF DESCRIPTION OF DRAWINGS

The following is a brief description of the drawings, which are presented for the purposes of illustrating the exemplary embodiments disclosed herein and not for the purposes of limiting the same.

DETAILED DESCRIPTION

Figure 1:
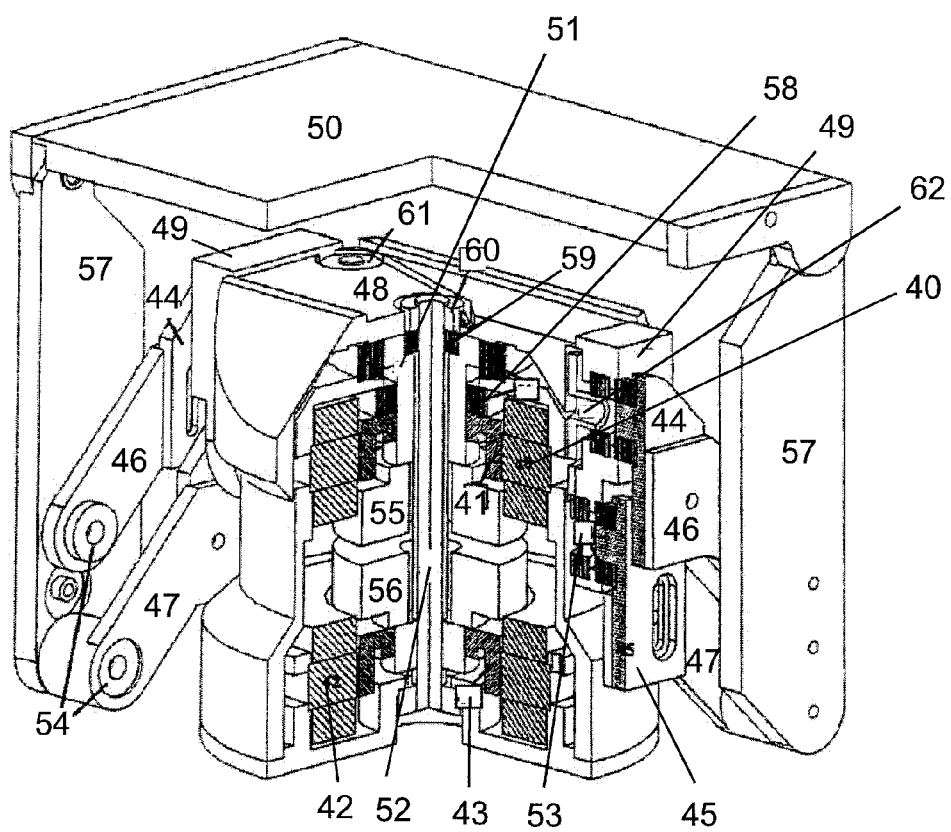
FIG. 1 is a cutaway view of a previous pan/tilt head that employs a pantographic mounting apparatus.

A more complete understanding of the processes and devices disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise. For example, "a" stop surface is described herein, and should be construed as including both one surface (e.g. formed by a wall) or two surfaces (e.g. two separate surfaces on two separate pins).

It should be noted that many of the terms used herein are relative terms. For example, the terms "upper" and "lower", and "top" and "bottom", and "central" and "outer", are relative to a central point. For example, an upper component is located in one direction from the central point and a lower component would be located in the opposite direction from the central point.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

The pan/tilt head of the present disclosure is an improvement on the pan/tilt head described in prior U.S. Pat. Nos. 7,527,439; 7,811,008; and 8,083,420, and can be used with camera control systems described in those disclosures. The pan/tilt head of those prior disclosures had a tilt range of −45 degrees to +45 degrees. In contrast, the pan/tilt head of the present disclosure can tilt between a full range of −90 degrees to +90 degrees. It should be noted that the direction of the plus/minus designation is arbitrary, i.e. the plus designation can refer to the camera pointing either into the sky or towards the ground.

FIG. 1 illustrates the pan/tilt head of the prior patents, which is helpful for understanding the advantages and differences of the present disclosure. The pan/tilt head includes a pan motor stator 40 and rotor 41, a tilt motor stator 42 and rotor 43, an upper elevator arm 44 and lower elevator arm 45 on each side, an upper crossbar 46 and lower crossbar 47 on each side, a pan table 48, with two pan table sides 49, a mounting platform 50 for the camera, a pan shaft 51, a tilt shaft 52, eight elevator arm bearings 53, eight crossbar bearings 54, a pan shaft position encoder 55, a tilt shaft position encoder 56, four vertical support bars 57, two pan shaft bearings 58, two tilt shaft bearings 59, a tilt shaft drive pulley 60, two cable guide pulleys 61 and two elevator arm pulleys 62.

A dual pantograph linkage is used to transmit the power from the pan table to the camera-mounting platform. Two elevator arms 44, 45, on each side of the pan/tilt head are connected to the pan table sides 49 and allowed to rotate around the centers of the upper and lower elevator arm bearings 53. A crossbar 46 is attached to each of the elevator arms in a manner, such as slotted holes and corresponding bolts, which allows the effective length of the elevator arms to be adjusted. At the left and right extremities of the crossbars, there are bearings 54 connecting each vertical camera platform support bar 57 with one end of the upper and lower crossbar 46, 47. There are four vertical supports in total supporting the camera platform 50 at each of its four corners. The effective length of each elevator arm is the distance from the center of the pan-table side bearing to the perpendicular line described by the bearings at the ends of its crossbar. This linkage configuration can be thought of as a dual pantograph because of the two parallelograms formed on each side of the pan-tilt head by the pan-table side 49, the front and rear vertical supports 57 on either side of it, and the imaginary lines between the elevator arm bearings 53 and the crossbar bearings 54. It should be noted that for free movement in the tilting plane, the distance between the upper and lower crossbar bearings where they attach each crossbar to the vertical support bar is the same as the distance between the upper and lower elevator arm bearings.

Figure 2:
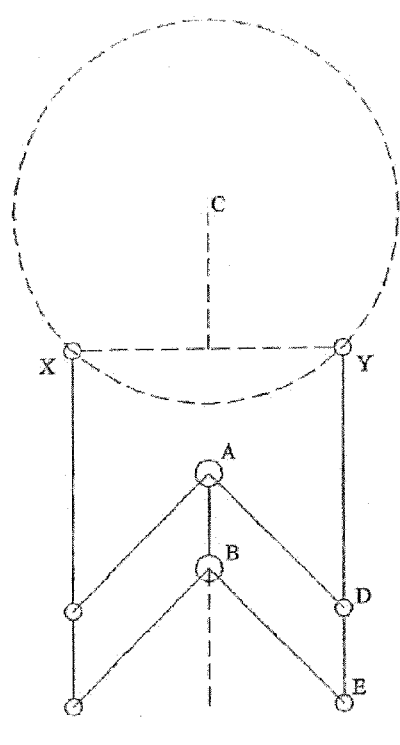
FIG. 2 is a graphic representation of the dual pantograph linkage in a horizontal position (i.e. a tilt of zero degrees).

FIG. 2 shows a graphical representation of the relationship between the elevator arm bearings (A and B) on the pan table, the crossbar bearings (D and E) on the vertical support bars, the vertical support bar (line YDE), and the camera mounting platform (dashed line XY). The dashed line descending from point B represents the effective length of the elevator arms. This length should be adjusted so that it is the same as the dashed line descending from point C, which represents the height from the base of the camera to the camera c.g. and the center of the dashed circle. The dashed circle in FIG. 2 represents the revolution of the mounting platform and its radius is the same as the distance from elevator arm bearing A to crossbar bearing D (line AD).

Figure 3:
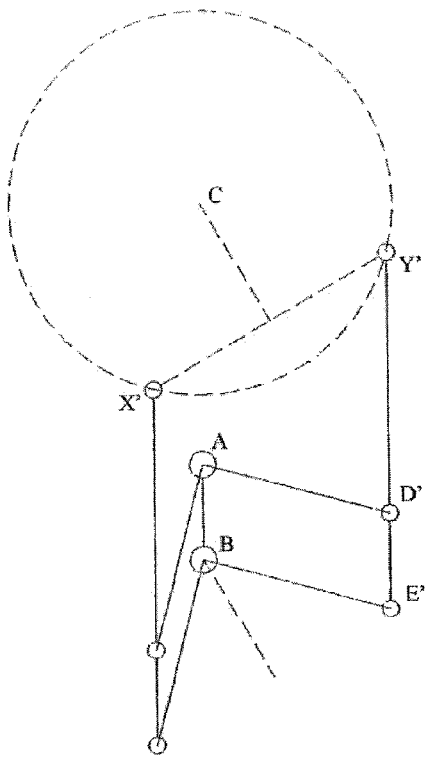
FIG. 3 is a graphic representation of the dual pantograph linkage of FIG. 2 after being tilted 30 degrees.

In FIG. 3 the elevator arms have been rotated 30 degrees around their bearings (points A and B). The bearings at points A and B are fixed with respect to the rotating pan-table. Because of the pantograph action of the elevator arms and crossbars, the vertical support bars (line Y'D'E') are held upright and parallel to the line formed by the upper and lower side bearings (line AB). As the vertical support bars travel along an arc following the circumference of the dashed circle, the connected camera platform and attached camera are tilted, following along the same arc depicted by the dashed circle. It can be seen that throughout this motion the camera c.g. at point C remains fixed directly above the centerline marked by the elevator arm bearings A and B (line AB).

FIG. 1 employs a motor configuration that takes particular advantage of the concentric positioning of the pan and tilt drive shafts. In a case where higher camera rotation speeds are required (and a reduced positioning accuracy), frameless torque motors may be employed in a direct drive configuration. Each motor is manufactured in two pieces—a rotor 41 and a stator 42. These motors do not have the housing and shaft bearings seen in most motors. In this case, the housing for the pan/tilt head provides the covering for each of two motor stators and rotors. The rotors are hollow. One rotor is fixed rigidly to the pan shaft 51 and the other rotor to the tilt shaft 52. The same bearings 58, 59, that support each of the pan and tilt shafts support the motor rotors and allow them to turn as an electric field is produced in the surrounding motor windings. This configuration allows for a cylindrical motor chassis (when viewed from above) which allows for better clearance for the camera rotating above. It is also potentially faster because speed reducing gears are not necessarily needed between the motor shaft and the associated pan or tilt shaft. However, as noted above, since the motor and, therefore, the rotation position encoder attached to it do, not make multiple revolutions for each camera revolution, the potential positioning resolution is reduced for a given encoder.

Figure 4:
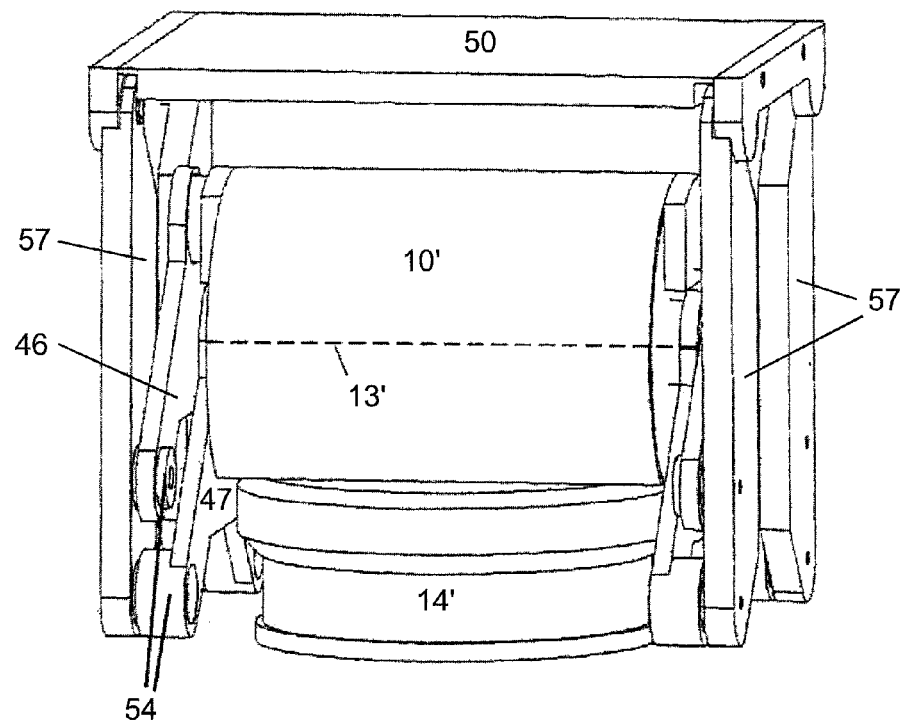
FIG. 4 is an exterior view of another pan/tilt head using a pantographic mounting apparatus, with the internal components being rearranged (the tilt motor rotated 90 degrees relative to FIG. 1).

FIG. 4 is another embodiment described in the prior U.S. Pat. Nos. 7,527,439; 7,811,008; and 8,083,420. Here, the pan motor 14' is mounted so that its drive shaft turns in a vertical axis, while the tilt motor 10' is mounted (as previously described) so that its drive shaft turns in a horizontal axis. In this embodiment, not only does the entire apparatus have a more traditional appearance, but, by placing the tilt motor 10' between the pantographic linkages 46, 47, 57, the tilt drive shaft may now be driven directly without the use of the tilt drive pulleys and cable. The tilt drive shaft 13' (dotted line) extends through the two bearings of the lower elevator arms 47 and runs directly through the center of the tilt motor 10'. The rotor of the frameless tilt motor is mounted on the tilt drive shaft 13' and relies on the elevator arm bearings for support during its rotation. All other aspects of the dual pantograph mounting remain the same as previously described.

As previously mentioned, the pan/tilt heads described in FIG. 1 and FIG. 4 have a tilt range of about −45 degrees to about +45 degrees. By including a tilt range extender, the pan/tilt heads of the present disclosure have a tilt range of about −90 degrees to about +90 degrees, i.e. the camera mounted on the platform can point completely downwards or upwards. This improved tilt range gives camera operators more operating flexibility.

Figure 5:
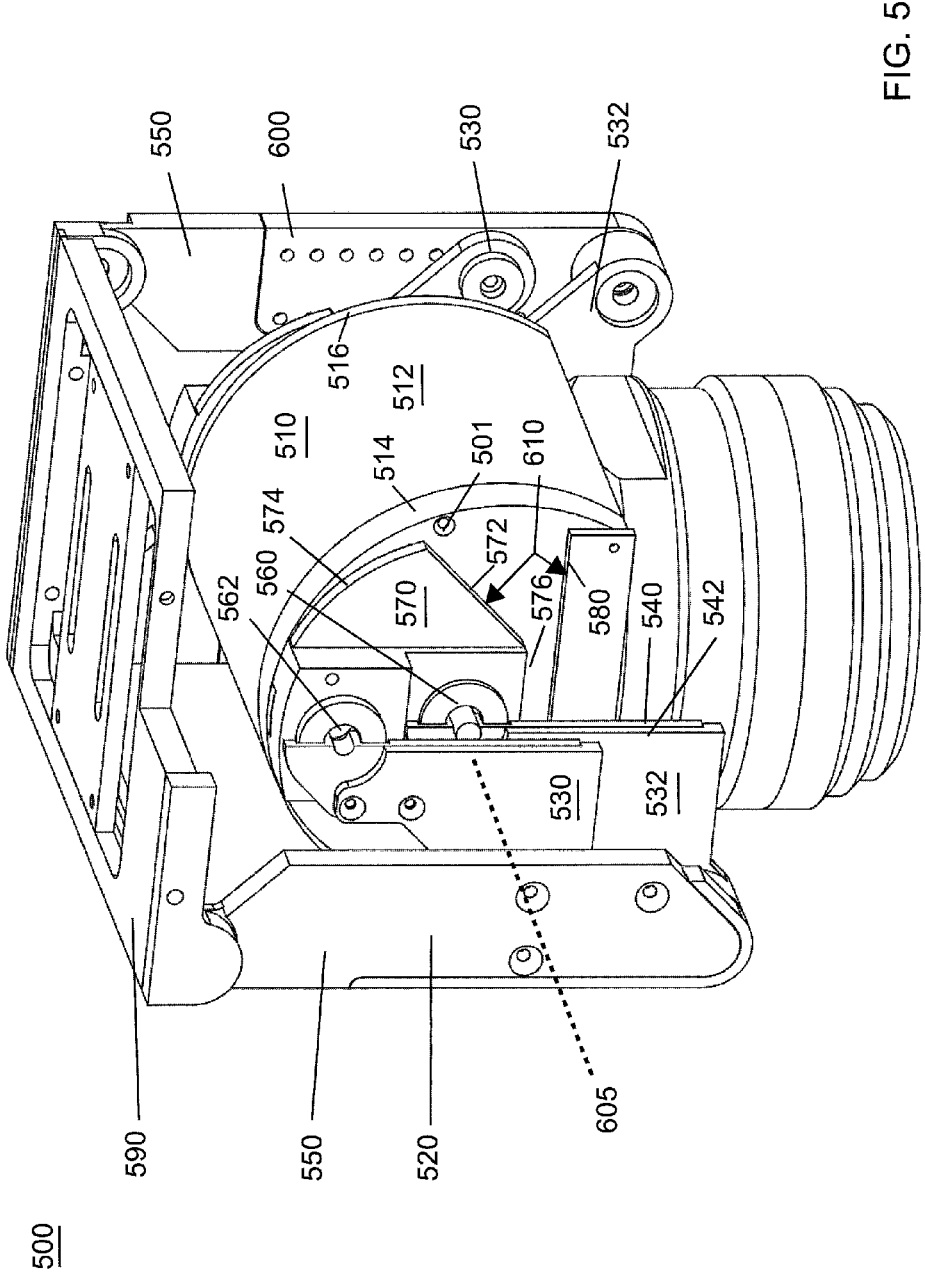
FIG. 5 is a side perspective view of a pan/tilt head having a tilt range extender. The tilt range extender here is in the form of a rotating member and a rectangular wall providing a stop surface for the rotating member. The rotating member is in a "zero degree" or central location, and the pantograph linkage being "squared off". One of the support bars of the pantograph linkage is removed so that a partial cross-sectional view is provided. The camera mounting platform obtains a zero degree tilt angle.

FIG. 5 is a side perspective view of an exemplary embodiment of a pan/tilt head having a tilt range extender of the present disclosure. A portion of the pan/tilt head is removed to provide a partial cross-sectional view, and to permit the components of the tilt range extender to be more visible.

The pan/tilt head 500 comprises a main housing 510 and a first pantograph linkage 520. A second pantograph linkage 600 is also visible on the opposite side, and is of the same construction as the first pantograph linkage. The pantograph linkage 520 is formed from an upper transverse member 530, a lower transverse member 532, and two support bars 550 (only one is shown; the other is removed to permit the cross-sectional view). The upper transverse member 530 may also be referred to herein as an outer transverse member, and the lower transverse member 532 may also be referred to herein as a central transverse member, as will be seen further herein. As depicted here, each transverse member is formed from an elevator arm 540 and a crossbar 542. A camera mounting platform 590 is connected to the end of the support bars 550. In this illustration, the support bars are substantially perpendicular to both the mounting platform and the transverse members.

The lower transverse member 532 is located at a center point 560 of the main housing. The upper transverse member 530 is connected to a circumferential point 562 of the main housing. The circumferential point is spaced apart from the center point. The circumferential point of the main housing can rotate around the center point. As seen in FIG. 5, the circumferential point 562 is located on a rotating member 570. The rotating member can be considered to be part of the main housing, or as a separate component. The rotating member 570 as depicted here has the shape of a wedge. The perimeter of the wedge is formed from an arc 574, two radial sides 572 (only one is visible here), and an inner surface 576. As will be seen later, in this embodiment the two radial sides will act as engagement surfaces. The rotating member 570 rotates about the center point 560. Put another way, a tilt axis 605 is present, and the rotating member 570 and the lower transverse member 532 are located along the tilt axis. As illustrated here, the rotating member is in a central or "zero" position.

Please note that the center point 560 is not located at the centre of the side of the main housing. In other words, the tilt axis 605 is offset from the centre. Rather, the center point is the point around which the rotating member rotates.

Here, the rotating member is shaped such that the circumferential point 562 can rotate through a total range of about 90 degrees (i.e. −45 degrees to +45 degrees). A stop surface 580 is also present, shown here in the form of a rectangular wall extending from the main housing 510. The engagement surface (here the radial side 572) of the rotating member cooperates with the stop surface 580 to control the extent of rotation of the upper transverse member 530. This combination of the engagement surface and the stop surface can be considered a tilt range extender 610.

It should be noted that while the stop surface and the engagement surface are shown here as flat surfaces, they can generally have any complementary shape. The key is that their interaction prevents the rotating member from rotating. Similarly, the shape of the rotating member 570 is not critical. For example, the outer arc 574 could be in the form of a straight line, such that the rotating member has a trapezoidal shape.

Put another way, the circumferential point 562 of the main housing can also be considered to be a rotating mount to which the outer transverse member 530 is connected. Similarly, the center point 560 of the main housing can be considered to be a non-rotating mount along the tilt axis to which the central transverse member 532 is connected. The rotating mount rotates about the tilt axis and the non-rotating mount.

The main housing 510 can also be described as being formed from a central housing 512, a first housing side 514, and a second housing side 516. The first housing side here is connected to the central housing by screws 501, one of which is visible. The head of this screw is located in a recess in the first housing side, so that the rotating member can travel past the screw.

Figure 6:
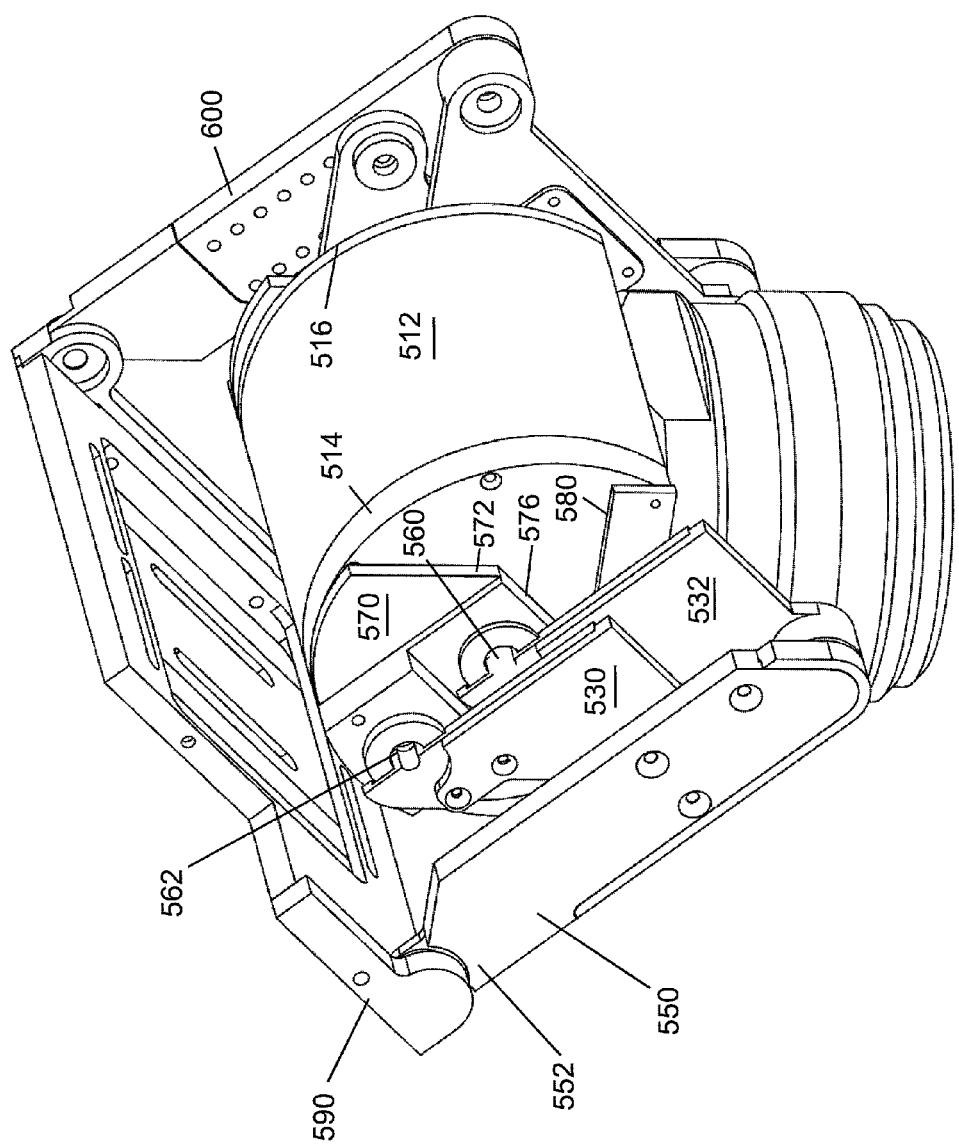
FIG. 6 is a second side perspective view of the pan/tilt head with tilt range extender of FIG. 5. Here, the rotating member is in a "-45 degree" location, and the pantograph linkage remains in the same position relative to the rotating member. Again, a partial cross-sectional view is provided. The camera mounting platform obtains a -45 degree tilt angle.

FIG. 6 is another picture of the exemplary embodiment of FIG. 5. Here, the rotating member 570 has been rotated 45 degrees to the left. The angle of the support bars 550 to the transverse members 530, 532 has not changed; they are substantially perpendicular to each other. The mounting platform 590 is visible here and is connected to the top end 552 of the support bars. A second pantograph linkage 600 is also connected to the mounting platform, and to the side of the main housing opposite the side of the first pantograph linkage.

Figure 7:
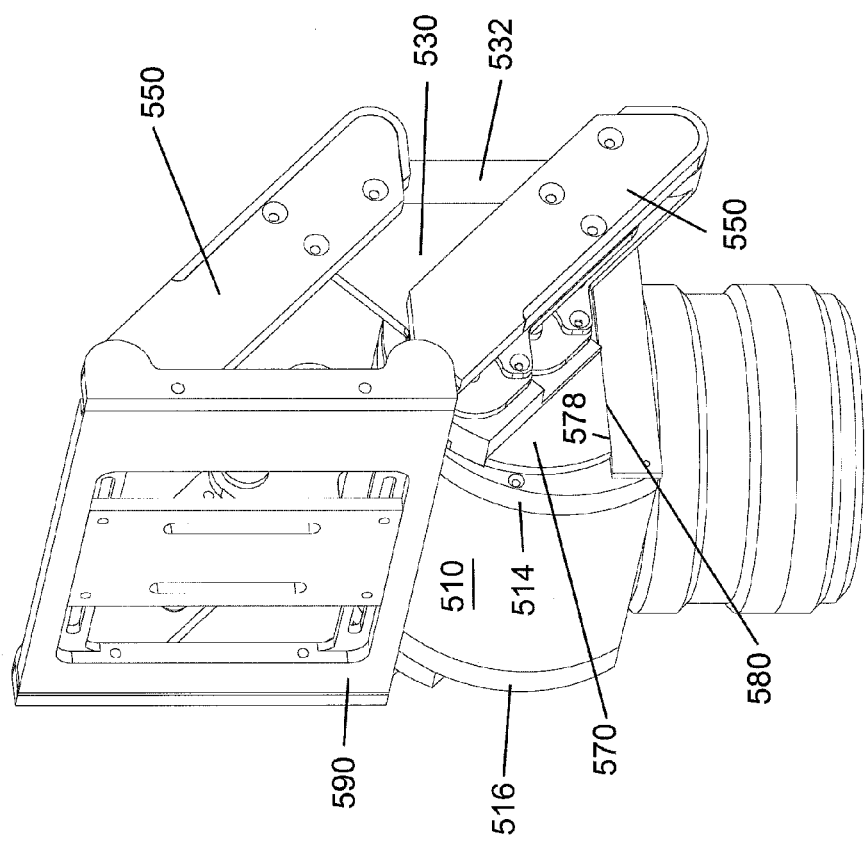
FIG. 7 is a front side perspective view of the pant/tilt head with tilt range extender of FIG. 5, with the camera mounting platform obtaining a -90 degree tilt angle due to the rotating member being tilted -45 degrees, and the pantograph linkage being tilted -45 degrees as well.
Figure 8:
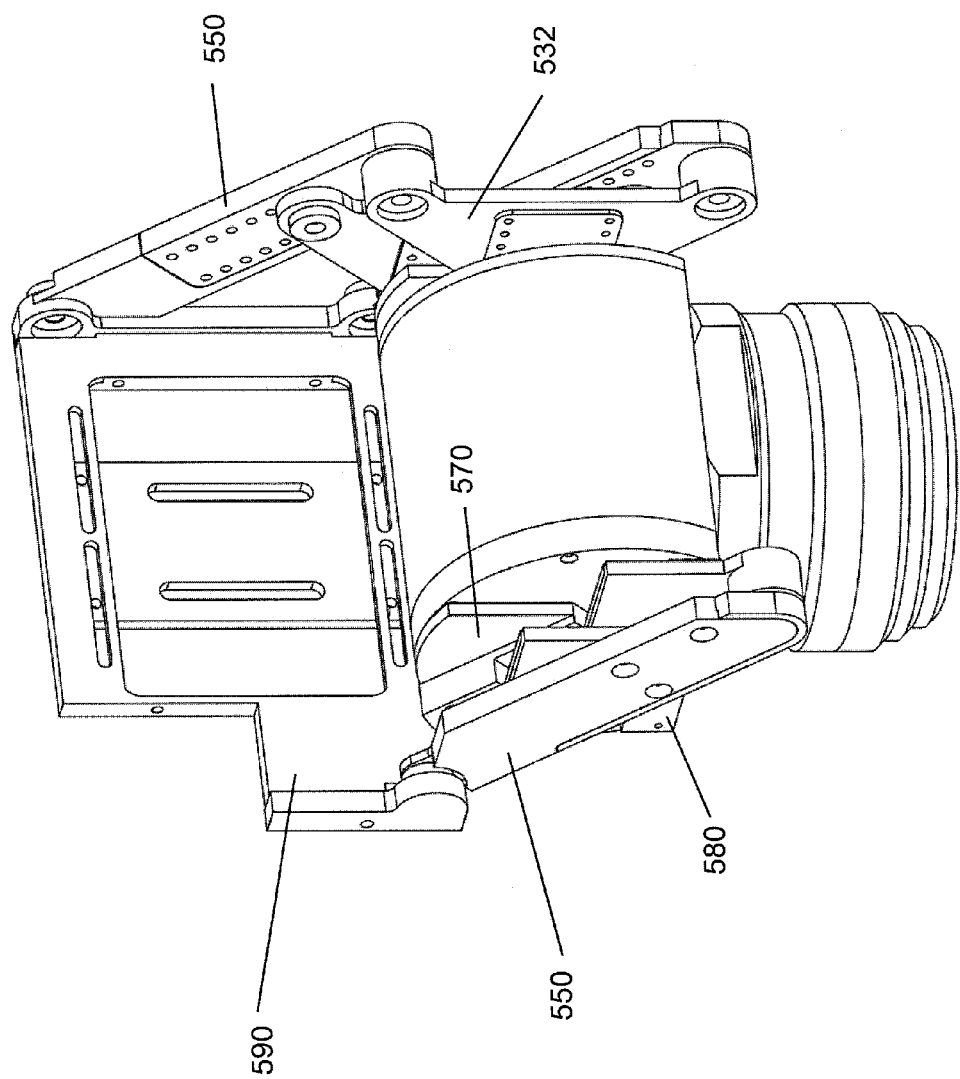
FIG. 8 is a view of the pant/tilt head with tilt range extender of FIG. 5, with the camera mounting platform obtaining a -90 degree tilt angle due to the rotating member being tilted, and the pantograph linkage being tilted as well. Again, a partial cross-sectional view is provided.

FIG. 7 and FIG. 8 are two different perspective views illustrating the tilt range extender being used to achieve a tilt angle of −90 degrees. Here, the tilt range extender (i.e. the rotating member of FIG. 5) is set at an angle of −45 degrees. The pantograph linkages are then further tilted another 45 degrees to achieve the tilt angle of −90 degrees. The support bars now form an approximately 45° angle with both the mounting platform and the transverse members. As best seen in FIG. 7, the stop surface 580 engages or cooperates with the engagement surface 578 provided by the rotating member 570.

Figure 9:
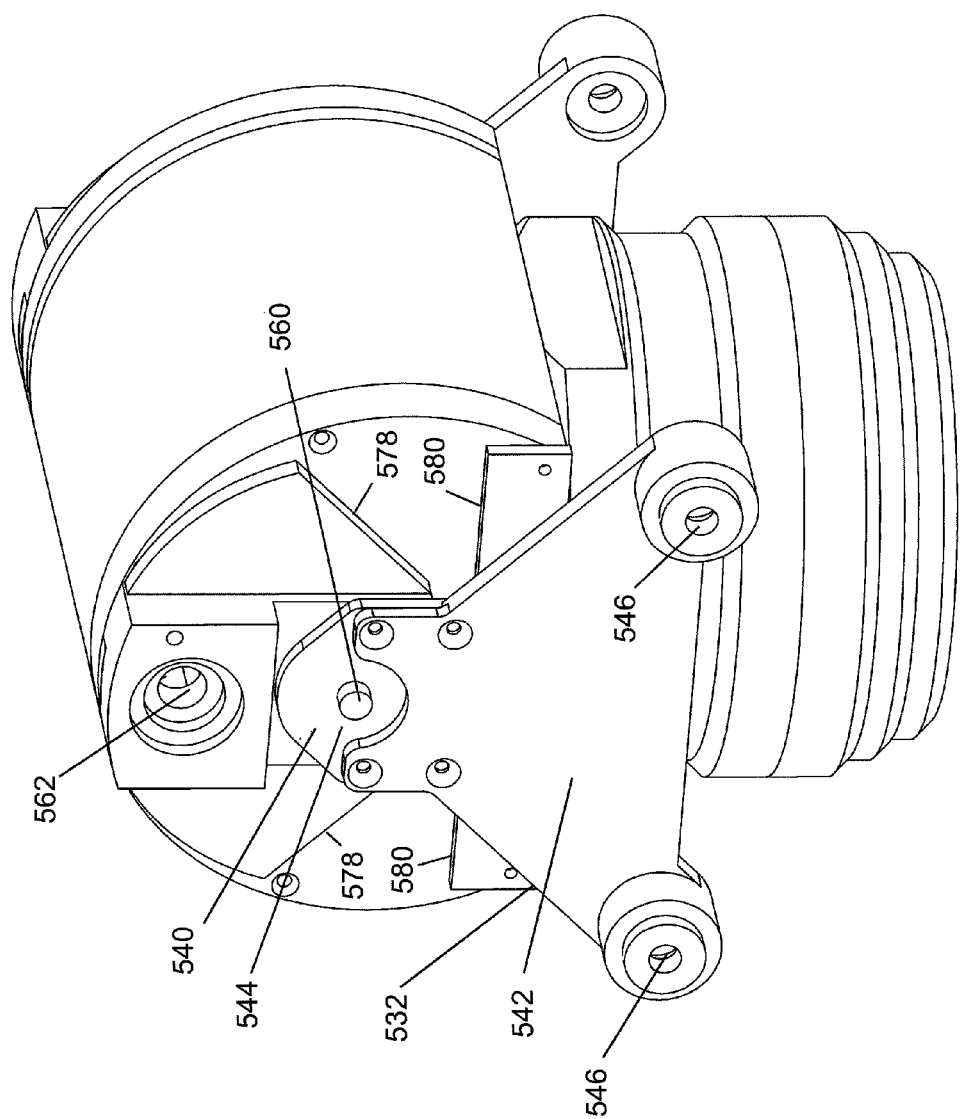
FIG. 9 is a close-up view showing a transverse member which is used to form a pantograph linkage. The transverse member is formed from an elevator arm and a crossbar. The support arms are removed for a better view.

It should be noted that the transverse member of FIG. 5 is a combination of the elevator arm and the crossbar described in FIG. 1. FIG. 9 is a picture in which the support bars and the upper transverse member have been removed and only the lower transverse member 532 is depicted so that various aspects of a transverse member can be seen. The upper transverse member and the lower transverse member have substantially identical construction. The transverse member 532 has a triangular shape. Here, only a portion of the elevator arm 540 is visible, though the elevator arm is also visible in the cross-sectional portion of FIG. 5. The elevator arm provides a mounting corner 544 to the transverse member. The crossbar 542 provides two support corners 546. The mounting corner is used to connect the pantograph linkage to the main housing, at the center point/non-rotating mount 560 for the lower transverse member and at the circumferential point/rotating mount 562 for the upper transverse member. The support corners are used to connect the transverse member to the bottom ends of the two support bars (one support corner for each support bar). The elevator arm 540 can be extended from the crossbar 542 to change the relative distance between the mounting corner 544 and the support corners 546.

As a result of including the tilt range extender, it should be noted that tilt angles between −45 degrees and 45 degrees can be achieved in multiple ways. For example, a tilt angle of −45 degrees can be achieved by aligning the tilt range extender such that the mounting corners 544 of the two transverse members are vertically aligned, then forming a parallelogram using the pantograph linkages to tilt the mounting platform. This way is illustrated in FIG. 3. Put another way, the tilt range extender is in the "zero" position of FIG. 5, and only the pantograph linkages are tilted. Using this method, the c.g. of the camera remains above the mounting corners.

Alternatively, a tilt angle of −45 degrees can be achieved by fixing the pantograph linkages to form a rectangle (i.e. right angles between the mounting platform and the two support bars), then tilting the tilt range extender instead. This way is illustrated in FIG. 6. Note that the two support bars 550 are parallel with the line formed by the mounting corners 560, 562 (similar to FIG. 2). The mounting platform 590 is at a 90 degree angle to the support bars 550, which are at a 45 degree angle to the base of the main housing. Using this method, the c.g. of the camera moves laterally, and is no longer above the mounting corners.

Figure 10:
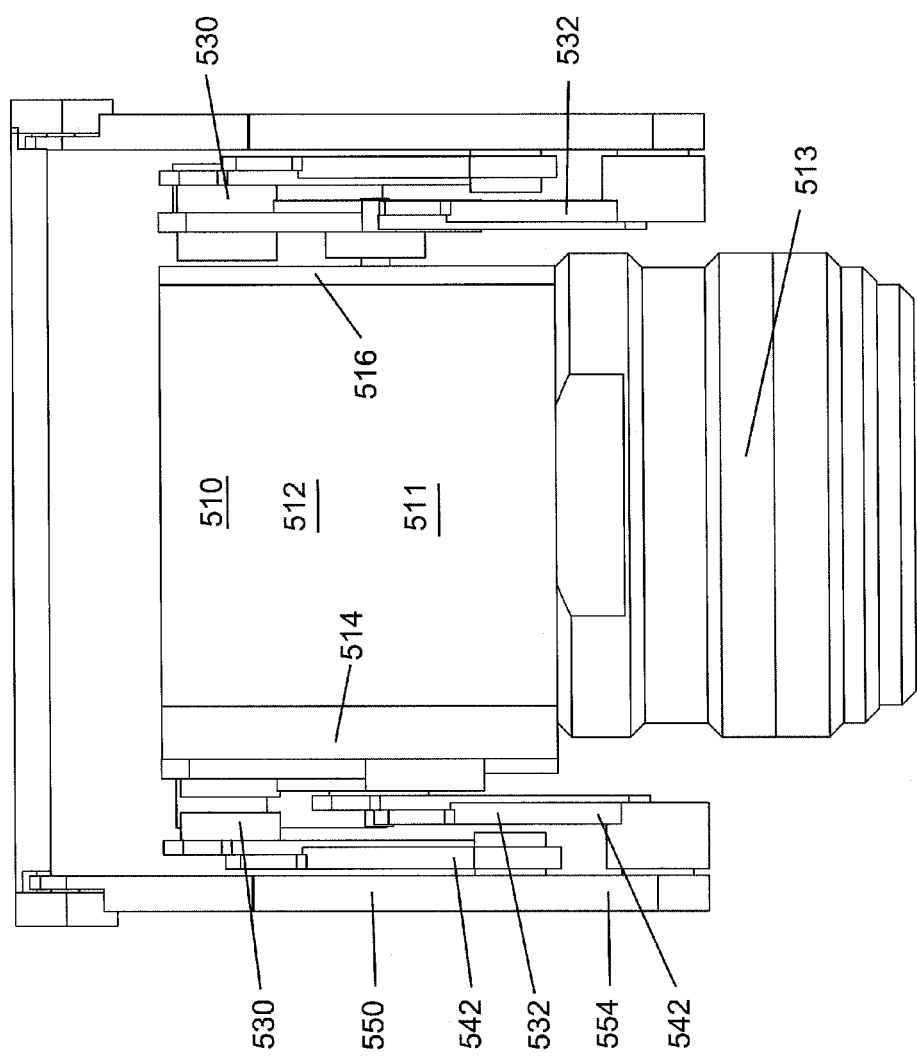
FIG. 10 is a front view showing some additional detail of the main housing and the transverse members.

FIG. 10 is a rear view showing some additional detail of the main housing 510 and the transverse members 530, 532. Referring to the right side, the upper transverse member 530 is spaced laterally further from the main housing 510 than the lower transverse member 532. As a result, the corners are shaped a little differently between the two transverse members. This difference can also be seen in FIG. 5. Referring to the left side, the bottom end 554 of a support bar 550 is attached to the two crossbars 542 of the transverse members. The central housing 512, the first housing side 514, and the second housing side 516 of the main housing can be seen. The central housing 512 can also be described as being formed from a tilt housing 511 and a pan housing 513.

Figure 11:
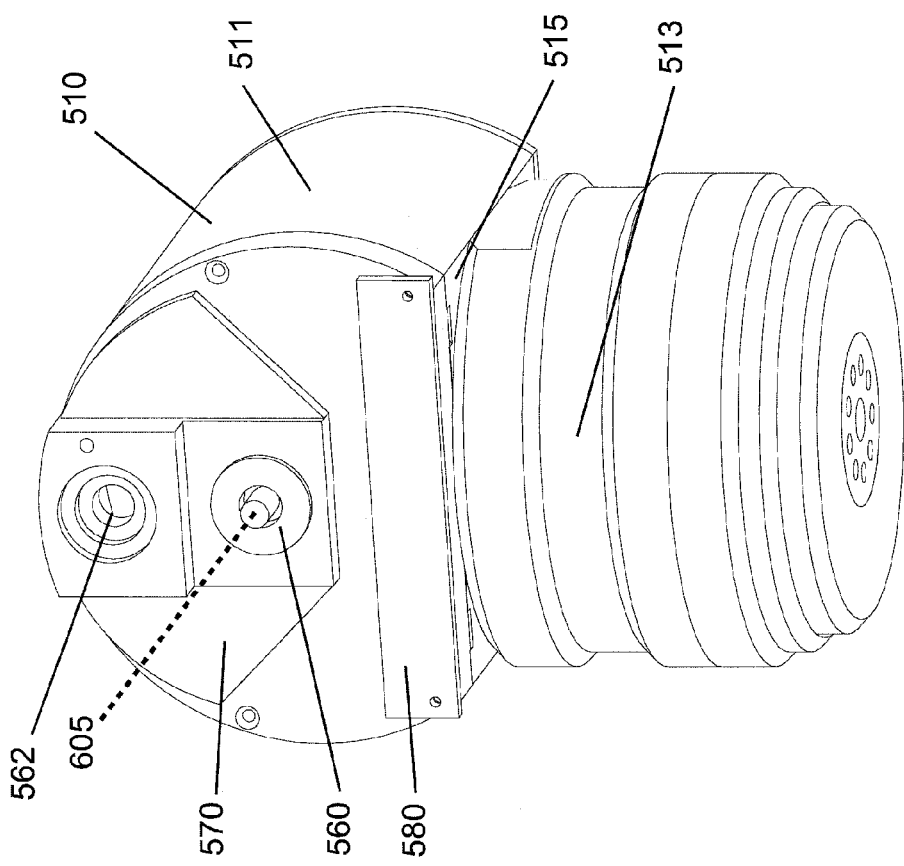
FIG. 11 is a bottom side perspective view of the side of the main housing. The pantograph linkage is removed for a better view of the main housing.

FIG. 11 is a bottom perspective view of the side of the main housing 510, with the pantograph linkage removed for better visibility. Here, a flat planar surface 515 can be seen at the junction between the tilt housing 511 and the pan housing 513. In this embodiment, the stop surface 580 is in the form of a wall, and is located at this junction. However, the stop surface can be of a different shape. For example, the stop surface could be in the form of two pegs extending from the side of the main housing. It is contemplated that in some embodiments, a backup stop surface can be located at this junction to act as a hard stop in case the primary stop surface 580 fails (for example, if the user turns the tilt range extender too far to one side, and there is no further hole in which a retractable pin can enter to stop the tilt).

Again, it should also be noted that from the side, the side of the main housing 510 is in the shape of a disk with a segment removed at the bottom (surface 515 being a chord of the disk). However, the center point 560 is not located at the centre of the disk. Put another way, the tilt axis 605 is offset from the centre, and a line drawn from the center point 560 to the perimeter of the main housing would not be a constant length as one moved about the perimeter. This is why the rotating member 570 in FIG. 5 has an arc of a different shape compared to the shape of the main housing 510.

In operating the pan/tilt head with a tilt range extender, a first tilt motor can be operatively coupled to the pantograph linkage(s). A second tilt motor can be operatively coupled to the tilt range extender. These tilt motors can independently control the degree of rotation of the pantograph linkage(s) and the tilt range extender. One or both tilt motors can be arranged within the main housing. A pan motor may also be arranged to rotate the main housing about the pan axis.

A version of the invention is envisioned without pan and tilt motor in which the movement is initiated manually by the camera operator through a traditional control arm affixed to the pantograph mechanism at some location such as the lower traverse member or the camera mounting platform. In all of the previous embodiments, the first 90 degrees of tilt motion attained through the action of the pantograph is the primary range because the center of gravity of the camera is not shifted either in its height above the floor or its distance from the panning axis. The additional 90 degrees of tilt motion provided by the tilt range extender is considered supplemental because rotating the tilt range extender will shift the camera center of gravity.

It is contemplated that in another version of a tilt range extender, the upper transverse member is connected to the rotating member 570 (see FIG. 5). The main housing can then provide a stop surface (on the first housing side 514) in the form of a hole that interacts with a retractable pin on an inner surface of the rotating member (the inner surface being the engagement surface of the rotating member). The rotating member could include multiple retractable pins that interact with one hole on the first housing side, or the first housing side could have multiple holes that interact with one retractable pin on the rotating member. Generally, there can be any number of such retractable pins and any number of holes to interact with the pins.

A different version of a tilt range extender is also contemplated in which the upper transverse member is connected to the rotating member. In this version, the inner surface of the rotating member acts as the engagement surface, and has a sawtooth shape that permits rotation in both directions. The first housing side of the main housing would also be in the form of a sawtooth. The two sawtooth surfaces would interact to control the extent of rotation.

Figure 12:
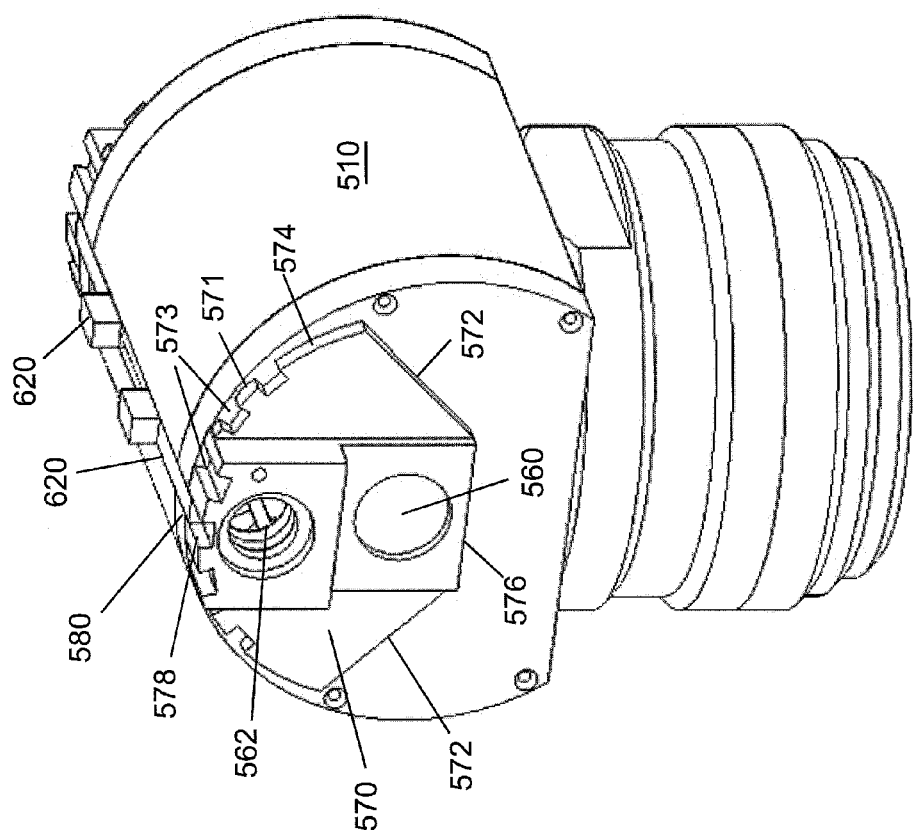
FIG. 12 is a perspective view of another exemplary embodiment of the tilt range extender of the present disclosure. Here, the rotating member includes teeth that interact with a stop surface provided in the form of a spar that extends laterally to engage the teeth.

FIG. 12 illustrates another different version of the tilt range extender. The pantograph linkage is removed for better visibility. Here, the upper transverse member would be connected to the rotating member 570 at the circumferential point 562. The rotating member 570 is connected to the main housing 510 at center point 560. Here, the perimeter of the rotating member is again formed from an inner surface 576, two radial sides 572, and an arc 574. However, the outer perimeter of the rotating member (i.e. the arc) is shaped to include teeth 571 and spaces 573 between the teeth. The main housing 510 includes two spars 620. Each spar is biased to extend away from the main housing and into the space 573 between teeth. The teeth act as the engagement surface 578 of the rotating member, and the spar provides the stop surface 580. Pinching the two spars together removes the spar from the space and permits rotation of the rotating member. Here, the engagement surface is on the arc of the rotating member, rather than on the radial sides as in FIG. 5.

It should be noted that the pan/tilt head of the present disclosure can include all of the features of the prior pan/tilt heads as described in FIGS. 1-4 as well.

While the present disclosure is described herein with respect to exemplary embodiments, it is evident that many alternatives, modifications, and variations will be apparent to those skilled in the art. It is intended that the present disclosure be construed as including all such modifications and alterations insofar as they come within the scope of the appended claims or the equivalents thereof.

The invention claimed is:

1. A pan/tilt head comprising:
   a main housing;
   a first pantograph linkage comprising an upper transverse member and a lower transverse member;
   the lower transverse member being located at a center point of the main housing and the upper transverse member being connected to a circumferential point of the main housing, the circumferential point being rotatable around the center point; and
   a mounting platform connected to the first pantograph linkage.

2. The pan/tilt head of claim 1, wherein the circumferential point can rotate through a range of about 90 degrees.

3. The pan/tilt head of claim 1, wherein the circumferential point is on a rotating member having an engagement surface.

4. The pan/tilt head of claim 3, further comprising a stop surface on the main housing that cooperates with the engagement surface to control the extent of rotation of the upper transverse member.

5. The pan/tilt head of claim 4, wherein the stop surface is in the form of a hole in the main housing that interacts with a retractable pin on the engagement surface of the rotating member.

6. The pan/tilt head of claim 4, wherein the stop surface is in the form of a sawtooth surface on a side of the main housing that interacts with an inner sawtooth surface of the rotating member.

7. The pan/tilt head of claim 4, wherein an outer perimeter of the rotating member includes teeth and spaces between the teeth, and the stop surface is in the form of a spar that extends from the main housing into a space between teeth.

8. The pan/tilt head of claim 1, wherein the first pantograph linkage further comprises two support bars; and
   wherein the upper transverse member and the lower transverse member each comprise an elevator arm and a crossbar, the elevator arm providing a mounting corner and the crossbar providing two support corners, each transverse member being connected to the main housing at the mounting corner, to the first support bar at one of the support corners and to the second support bar at the other support corner.

9. The pan/tilt head of claim 8, wherein the mounting platform is connected to the two support bars.

10. The pan/tilt head of claim 1, further comprising a second pantograph linkage connected to a side of the main housing opposite that of the first pantograph linkage.

11. The pan/tilt head of claim 1, further comprising a tilt motor arranged within the main housing and a pan motor arranged to rotate the main housing about a pan axis.

\* \* \* \* \*